US007752160B2

(12) United States Patent
Finlay et al.

(10) Patent No.: US 7,752,160 B2
(45) Date of Patent: Jul. 6, 2010

(54) METHOD FOR UNORDERED RELATIONAL DATABASE RETRIEVAL RETURNING DISTINCT VALUES

(75) Inventors: Ian R. Finlay, Uxbridge (CA); Tony Wen Hsun Lai, Toronto (CA); Daniel C. Zilio, Georgetown (CA); Calisto Paul Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 10/188,569

(22) Filed: Jul. 2, 2002

(65) Prior Publication Data

US 2003/0014390 A1 Jan. 16, 2003

(30) Foreign Application Priority Data

Jul. 12, 2001 (CA) ................................ 2353015

(51) Int. Cl.
*G06F 17/30* (2006.01)
(52) U.S. Cl. .................................... 707/3; 707/1; 707/5
(58) Field of Classification Search .................. 707/1–7
See application file for complete search history.

(56) References Cited

U.S. PATENT DOCUMENTS

| 5,201,046 | A | * | 4/1993 | Goldberg et al. ............ 707/100 |
| 5,557,788 | A | | 9/1996 | Inoue ......................... 395/600 |
| 5,615,361 | A | * | 3/1997 | Leung et al. .................... 707/3 |
| 5,659,728 | A | | 8/1997 | Bhargava et al. ............ 395/602 |
| 5,689,697 | A | | 11/1997 | Edwards et al. ............. 395/603 |
| 5,696,960 | A | | 12/1997 | Bhargava et al. ............ 395/602 |
| 5,724,070 | A | * | 3/1998 | Denninghoff et al. ........ 345/547 |
| 5,764,973 | A | * | 6/1998 | Lunceford et al. ............. 707/1 |
| 5,822,748 | A | * | 10/1998 | Cohen et al. .................... 707/2 |
| 5,842,224 | A | | 11/1998 | Fenner |
| 5,860,070 | A | * | 1/1999 | Tow et al. ....................... 707/8 |
| 5,903,887 | A | | 5/1999 | Kleewein et al. |
| 5,937,401 | A | * | 8/1999 | Hillegas ......................... 707/2 |
| 5,974,408 | A | * | 10/1999 | Cohen et al. .................... 707/2 |
| 5,995,959 | A | * | 11/1999 | Friedman et al. ............... 707/3 |
| 6,788,316 | B1 | * | 9/2004 | Ma et al. ..................... 715/760 |
| 6,801,906 | B1 | * | 10/2004 | Bates et al. .................... 707/3 |
| 6,907,414 | B1 | * | 6/2005 | Parnell ......................... 706/47 |
| 2003/0078923 | A1 | * | 4/2003 | Voss et al. ..................... 707/7 |

* cited by examiner

*Primary Examiner*—Cam-Linh Nguyen
(74) *Attorney, Agent, or Firm*—Sawyer Law Group, P.C.

(57) ABSTRACT

The retrieval of distinct tuples in a relational database management system. In response to a request from a consumer process for distinct tuples in a relational database table matching a defined criteria, a distinct operator component sequentially requests tuples from a source component. The source component access the database table and returns a tuple in the sequence to the distinct operator component. The distinct operator component passes each tuple in the sequence to an auxiliary logger. The auxiliary component receives a tuples from the distinct component and determines if it is distinct from other previously received tuples in the sequence to verify its uniqueness to the distinct operator. Tuples that are verified as unique by the auxiliary logger are returned to the consumer process by the distinct operator upon verification.

17 Claims, 3 Drawing Sheets

METHOD FOR UNORDERED RELATIONAL DATABASE RETRIEVAL RETURNING DISTINCT VALUES

FIELD OF THE INVENTION

The present invention generally relates to relational database management systems, and in particular to relational database retrieval constrained to return distinct values.

BACKGROUND OF THE INVENTION

In relational database management systems, typically relational queries are supported which may be constrained to return distinct tuples or rows. An example is the SQL keyword DISTINCT which, when used to qualify a query, ensures that there are no duplicate rows in the returned set of data satisfying the query.

In the prior art, such queries are implemented by the returned set of rows or tuples being calculated and then sorted. After the sort is carried out, the duplicate rows are discarded and the unique set of rows or tuples is returned.

Where a relational database is used as a backend for a time sensitive application, such as a website, for example, the time needed to sort the resulting table before discarding the duplicate rows may result in user dissatisfaction. In addition, where the data is to be presented to the user in a previously established order, after duplicate filtering the resulting table must be reordered to reflect that previously established order.

It is therefore desirable to provide an implementation of the relational query that is constrained to return distinct or unique values but which is not subject to initial delays in presenting resulting rows to a user and in which the resulting table retains a previously established ordering.

SUMMARY OF THE INVENTION

According to an aspect of the present invention there is provided improved retrieval of distinct tuples or rows in a relational database management system.

According to another aspect of the present invention there is provided a method for sequentially providing a consumer process with a set of relational data including tuples matching a defined criteria, the method including the steps of:
  retrieving from a database table a tuple in a sequence of tuples, the tuple satisfying the defined criteria,
  determining whether the tuple is unique in comparison to previously retrieved tuples in the sequence,
  providing the consumer process with the tuple where the tuple is unique and discarding the tuple where the tuple is not unique, and
  repeating the above steps until all tuples matching the defined criteria have been retrieved from the relational table.

According to another aspect of the present invention there is provided a relational database management system including a distinct operator component, a source component, and an auxiliary logger component, the relational database management system supporting the provision of data from a defined table to a consumer process, the consumer process requesting data from the distinct operator component, the distinct operator component including:
  means for sequentially requesting a set of tuples from the source component upon a request from the consumer process, and for accepting tuples returned from the source component,
  means for sequentially passing the tuples in the set of tuples to the auxiliary logger component for uniqueness verification, and
  means for passing only verified unique tuples to the consumer process,
  the source component including means for accessing a tuple in the set of tuples from the defined table upon request from the distinct operator component and providing the tuple to the distinct operator component, and
  the auxiliary component including means for sequentially receiving tuples in the set of tuples from the distinct component and means for determining if each sequentially received tuple is distinct from other previously returned tuples in the sequence to verify the uniqueness of each sequentially received tuple to the distinct operator component.

According to another aspect of the present invention there is provided the above relational database management system in which the means for determining if each sequentially received tuple is distinct includes a hash table to which each unique sequentially received tuple is added.

According to another aspect of the present invention there is provided the above relational database management system in which the means for determining if each sequentially received tuple is distinct includes a sorted data structure to which each unique sequentially received tuple is added.

According to another aspect of the present invention there is provided a computer program product including a computer usable medium tangibly embodying computer readable program code means for implementing the retrieval of distinct tuples in a relational database management system, the computer readable program code means including a distinct operator component, a source component, and an auxiliary logger component, the relational database management system supporting the provision of data from a defined table to a consumer process, the consumer process requesting data from the distinct operator component, the distinct operator component including:
  code means for sequentially requesting a set of tuples from the source component upon a request from the consumer process, and for accepting tuples returned from the source component,
  code means for sequentially passing the tuples in the set of tuples to the auxiliary logger component for uniqueness verification, and
  code means for passing only verified unique tuples to the consumer process,
  the source component including code means for accessing a tuple in the set of tuples from the defined table upon request from the distinct operator component and providing the tuple to the distinct operator component, and
  the auxiliary component including code means for sequentially receiving tuples in the set of tuples from the distinct component and including means for determining if each sequentially received tuple is distinct from other previously returned tuples in the sequence to verify the uniqueness of each sequentially received tuple to the distinct operator component.

Advantages of the invention include the ability to provide tuples to a consuming process as they are verified for uniqueness and to provide the tuples in the sequence in which they are received from the database table.

BRIEF DESCRIPTION OF THE DRAWINGS

In the accompanying drawing which illustrate the invention by way of example only.

Figure 1:
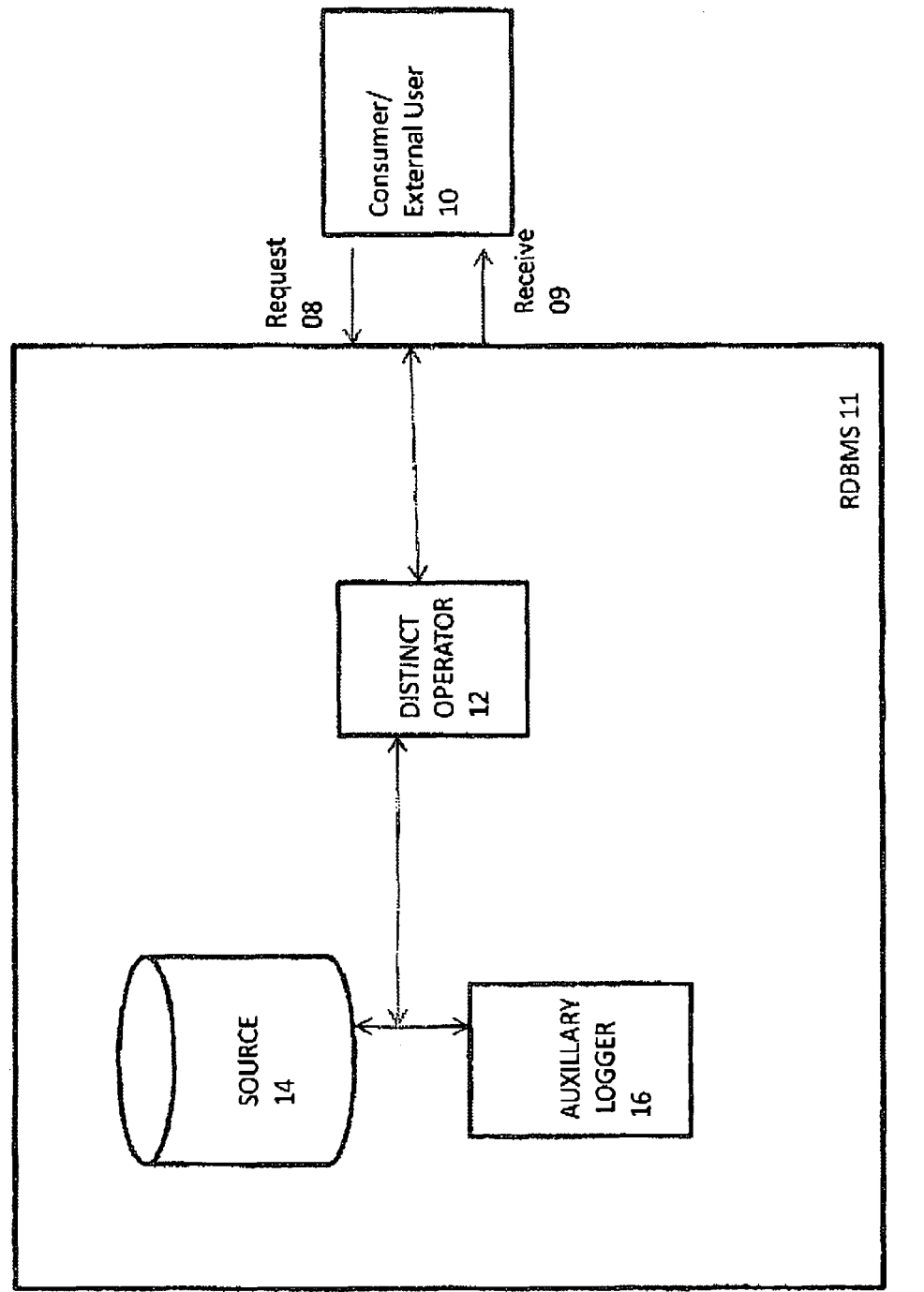
FIG. 1 is a block diagram illustrating an implementation of the preferred embodiment of the invention in accordance with one implementation.

In the drawing, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION

The present invention generally relates to relational database management systems, and in particular to relational database retrieval constrained to return distinct values. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

FIG. 1 shows, in a block diagram view, different processes 100 which implement the relational database query of the preferred embodiment. It will be appreciated by those skilled in the art that the preferred embodiment may be implemented in different relational database management systems (RDBMSs). The functionality of the different constituents shown in FIG. 1 may be achieved by other arrangements of computer components. For example, the description of the preferred embodiment refers to different processes. In other implementations the processes may be replaced by procedures. In either approach the system will include components to carry out the functions described below.

In FIG. 1, consumer 10 represents a process that initiates a data retrieval request (08) constrained to return distinct values (09). Consumer 10 makes a request at 08 for a set of tuples (rows) from a relational database table. Consumer 10 receives row data from the table at 09 in response to the request of 08. In this sense, consumer 10 is a consumer of the data. As will be appreciated, consumer 10 may be, for example, a process invoked by an SQL compiler in response to a user query or may be a process which is invoked as part of a more complex RDBMS operation.

In the preferred embodiment, distinct operator 12 is a component (a process, in the preferred embodiment) that carries out the steps to retrieve tuples from a defined table and to return those tuples to consumer 10 without duplicates in the returned set. Distinct operator 12 invokes source 14 which in the preferred embodiment is a process that returns single tuples from a relational table. Auxiliary logger 16 is a process that receives a tuple from distinct operator 12. Auxiliary logger 16 both records (logs) the tuple and indicates whether the tuple has been previously seen by auxiliary logger 16 nor not.

In the preferred embodiment, consumer 10 sends a request for tuples meeting a set of defined selection criteria (for example, matching a query predicate) to distinct operator 12. By using distinct operator 12, consumer 10 is seeking a set of tuples that contain no duplicate values. Distinct operator 12 sequentially processes the request for tuples using source 14. Source 14 responds to requests from distinct operator 12 by providing one tuple at a time to distinct operator 12. Distinct operator 12 handles tuples from source 14 by sending each tuple in the sequence to auxiliary logger 16. Auxiliary logger 16 returns a value to distinct operator 12 indicating whether the tuple value has been seen in the set of values retrieved from source 14. In effect, auxiliary logger 16 verifies the uniqueness or (distinctness) of the received tuple in comparison with previously received tuples in the sequence. It will be apparent to those skilled in the art how to initialize auxiliary logger 16 to delimit the sequence of tuples that are returned in response to the request from consumer 10.

Auxiliary logger 16 maintains a data structure to permit the identification of tuple values that have previously been obtained from source 14. One approach to implementing auxiliary logger 16 is for the process to maintain a sorted table into which unique tuples are stored. When a tuple is passed to auxiliary logger 16 that tuple will be added to the table if it is not already in the table. Where the tuple value is already in the table, auxiliary logger 16 returns a value to distinct operator 12 to indicate that the tuple value is not unique. Where auxiliary logger 16 determines that the tuple has a distinct or unique value (relative to those in the sequence), the process returns a value to distinct operator 12 to indicate the tuple is distinct (verifies uniqueness).

In the case where distinct operator 12 passes a tuple value to auxiliary logger 16 and the responding value signifies that the tuple value has not already been retrieved from source 14 in the defined sequence, distinct operator 12 passes the tuple to consumer 10. Otherwise the tuple is ignored and not passed to consumer 10. In this manner consumer 10 receives a unique set of tuples.

As may be seen from the above description, this approach to data retrieval from a relational database where distinct values are required permits tuples to be returned to the requesting process (consumer 10 in the preferred embodiment illustration of FIG. 1) without having to carry out a potentially slow sort of the entire set of retrieved tuples. The first tuple retrieved will be quickly passed to consumer 10 and it is expected that other tuples may be quickly checked by auxiliary operator 16 and passed to consumer 10 when they are determined to be distinct. This approach will provide the potential advantage of supplying data to consumer 10 early in the retrieval process. Where, for example, the data is retrieved for use in a web-page environment, the first display page of data may be more quickly determined than was the case in the prior art approach which required a sort of the entire retrieved set of tuples before any data was returned to consumer 10.

In addition, the data returned to consumer 10 will be maintained in the same sequence as source 14 accesses the data. This will be advantageous in applications where the sequencing of the retrieved data is important.

As will be appreciated, auxiliary logger 16 may be implemented using different data structures and methods to determine if a given tuple value has already been passed to auxiliary logger 16. The process may, for example, employ a hash table to check and enter new tuple values.

Figure 2A:
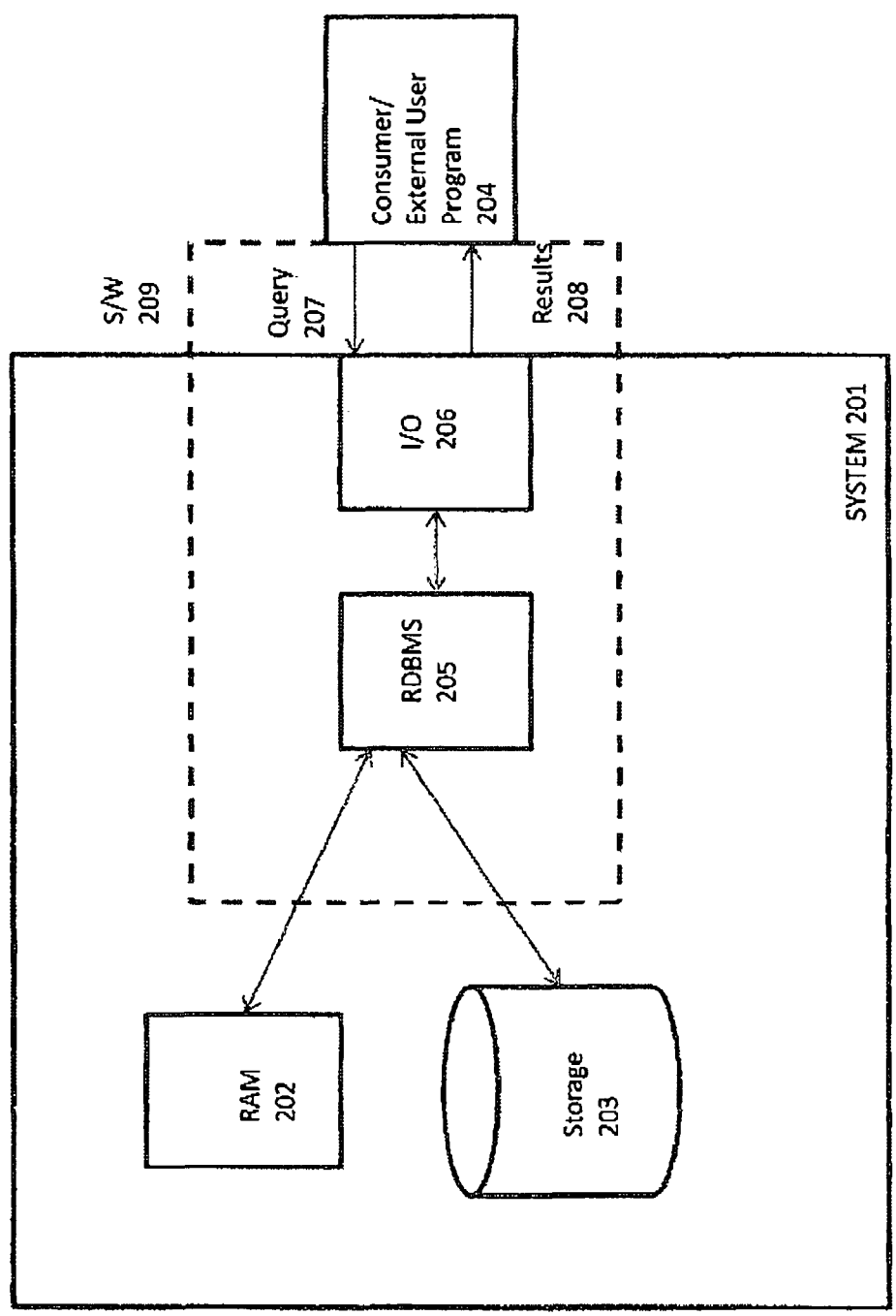
FIG. 2A is an exemplary block diagram of a system in context with a relational database management system of the present invention in accordance with one implementation; and, FIG. 2B is an exemplary block diagram of a relational database management system of the present invention in accordance with one implementation.

FIG. 2A is an exemplary block diagram of a system 201 in context with a relational database management system 205 of the present invention in accordance with one implementation. In the system 201, random access memory 202 and storage 203 are in communication with the relational database management system (RDBMS) 205 which is capable of receiving input 207 and sending output at 208 via 206 to external programs 204. Instructions for receiving a sending input and output, in addition to instructions for performing the present invention, are set forth at 209, which may be software, computer-readable instructions, or similar.

Figure 2B:
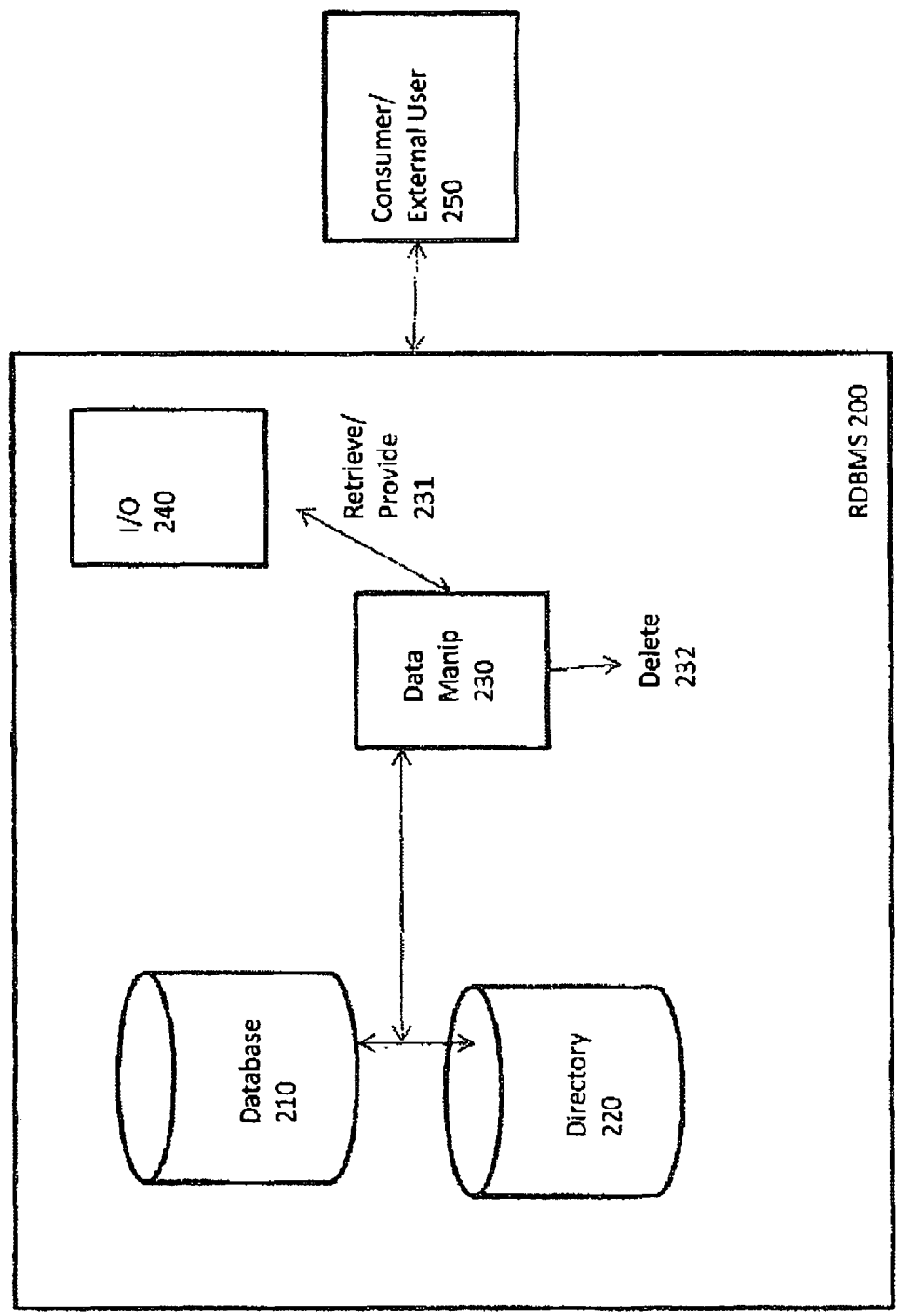

FIG. 2B is an exemplary block diagram of a relational database management system 200 of the present invention in accordance with one implementation. The RDBMS 200, in one implementation, includes a database 210 having tuples, a directory for interaction with the database 220, a data manipulation process at 230 such as assessing, evaluating or otherwise determining the uniqueness of the data retrieved and preparing to provide such via 231 for output at 240, or deleting such at 232, and an external program at 250. However, the present invention is not so limited to such a single RDBMS exemplary implementation.

As will be further appreciated, although the preferred embodiment has been described with reference to distinct processes, the preferred embodiment may be implemented by processes which combine one or more of the functions in the processes shown in FIG. 1. For example, auxiliary logger 16 may be implemented as a part of distinct operator 12, not as a separate procedure or process.

In the preferred embodiment described above, source 14 returns a single tuple in response to a request from distinct operator 12. Certain optimized implementations of the preferred embodiment support source 14 returning multiple tuples to distinct operator 12 in response to a request. In this case distinct operator 12 may continue to pass returned tuples to auxiliary logger 16 on a tuple by tuple basis. Alternatively, distinct operator 12 may pass auxiliary logger 16 a set of tuples. In this latter implementation, auxiliary logger 16 will return a data structure corresponding to the set of tuples passed to it, to enable distinct operator 12 to determine which tuples in the set are to be returned to consumer 10. As will be appreciated, where the components in the preferred embodiment pass sets of tuples, the size of the set will affect the ability of the preferred embodiment to return tuples promptly to consumer 10. A set size limit is selected to ensure that this advantage of the invention is not minimized. Although a preferred embodiment of the invention has been described above, it will be appreciated by those skilled in the art that variations may be made, without departing from the spirit of the invention or the scope of the appended claims.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method performed by a process in a computer system for providing a set of relational data to a consumer process, the method comprising the steps of:
   (a) retrieving from a database table a tuple in a sequence of tuples upon receiving a query from the consumer process requesting distinct tuples;
   (b) determining using an auxiliary logger component whether the retrieved tuple is unique in comparison to previously retrieved tuples in the sequence by using a sorted table that stores the unique tuple wherein the retrieved tuple may be returned to the consumer process immediately after the retrieved tuple is determined to be unique without sorting the entire set of tuples and indicating whether the retrieved tuple has been previously received by the auxiliary logger component;
   (c) providing using a distinct operator component the consumer process with the retrieved tuple where the tuple is unique and discarding the tuple where the tuple is not unique; and
   (d) repeating the above steps until all tuples in the sequence of tuples have been retrieved from the database table,
   wherein at least one distinct tuple in the sequence of tuples is provided to the consumer process prior to retrieval of all tuples in the sequence of tuples from the database table.

2. The method of claim 1, wherein the method is performed in a relational database management system comprising
   a source component;
   the auxiliary logger component being an auxiliary logger component; and
   the distinct operator component.

3. The method of claim 2 wherein the consumer process further comprises requesting data from the distinct operator component,
   the distinct operator component sequentially requesting a set of tuples from the source component upon receiving a query from the consumer process requesting distinct tuples, and for accepting tuples returned from the source component, for sequentially passing the tuples in the set of tuples to the auxiliary logger component for uniqueness verification, and for passing only verified unique tuples to the consumer process,
   the source component for retrieving a tuple in the set of tuples from the defined table upon request from the distinct operator component and providing the tuple to the distinct operator component, and,
   the auxiliary logger component for sequentially receiving tuples in the set of tuples from the distinct operator component and determining if each sequentially received tuple is distinct from other previously received tuples in the set of tuples to verify the uniqueness of each sequentially received tuple to the distinct operator component.

4. The method of claim 3, further comprising adding the auxiliary logger component including a hash table to each unique sequentially received tuple.

5. The relational database management system of claim 3, in which the auxiliary logger component further includes a sorted data structure to which each unique sequentially received tuple is added.

6. The method of claim 2, wherein instructions for the source component include instructions for retrieving a tuple in the set of tuples from the defined table upon request from the distinct operator component and providing the tuple to the distinct operator component, and,
   wherein instructions for the auxiliary logger component further includes instructions for sequentially receiving tuples in the set of tuples from the distinct component and for determining if each sequentially received tuple is distinct from other previously received tuples in the set of tuples to verify the uniqueness of each sequentially received tuple to the distinct operator component.

7. The method of claim 1, in which determining if each sequentially received tuple is distinct includes instructions for maintaining a hash table, for verifying uniqueness of tuples using the hash table and for adding each unique sequentially received tuple to the hash table.

8. The method of claim 7, in which the instructions for determining if each sequentially received tuple is distinct further includes instructions for maintaining a sorted data structure, for verifying uniqueness of tuples using the sorted data structure and for adding each unique sequentially received tuple to the sorted data structure.

9. A relational database management system comprising a source component;
an auxiliary logger component, and a distinct operator, the relational database management system supporting the provision of data from a defined table to a consumer process, the consumer process requesting data from the distinct operator component;
the distinct operator component for sequentially requesting a set of tuples from the source component upon a request from the consumer process, and for accepting tuples returned from the source component, for sequentially passing the tuples in the set of tuples to the auxiliary logger component for uniqueness verification, and for passing only verified unique tuples to the consumer process, the source component for accessing a tuple, in the set of tuples from the defined table upon request from the distinct operator component and providing the tuple to the distinct operator component, and the auxiliary logger component for sequentially receiving tuples in the set of tuples from the distinct operator component and determining using an auxiliary component if each sequentially received tuple is distinct from other previously returned tuples in the sequence to verify the uniqueness of each sequentially received tuple to the distinct operator component and indicating whether the retrieved tuple has been previously received by the auxiliary component.

10. The relational database management system of claim 9 in which the auxiliary component includes a hash table to which each unique sequentially received tuple is added.

11. The relational database management system of claim 9 in which the auxiliary component includes a sorted data structure to which each unique sequentially received tuple is added.

12. A computer readable medium containing program instructions for the retrieval of distinct tuples in a relational database management system, the program instructions for providing a distinct operator component, providing a source component, and
providing an auxiliary logger component, wherein the relational database management system supports the provision of data from a defined table to a consumer process, wherein the consumer process requests data from the distinct operator component, wherein the instruction for the distinct operator component further includes instructions for:
sequentially requesting a set of tuples from the source component upon a request from the consumer process, and for accepting tuples returned from the source component sequentially passing the tuples in the set of tuples to the auxiliary logger component for uniqueness verification, and
passing only verified unique tuples to the consumer process, the source component comprising code means for accessing a tuple in the set of tuples from the defined table upon request from the distinct operator component and providing the tuple to the distinct operator component, and
wherein the instructions for the auxiliary logger component further includes instructions for sequentially receiving tuples in the set of tuples from the distinct component and for determining using an auxiliary component if each sequentially received tuple is distinct from other previously returned tuples in the sequence to verify the uniqueness of each sequentially received tuple to the distinct operator component and indicating whether the retrieved tuple has been previously received by the auxiliary component.

13. The computer readable medium of claim 12 in which the instructions for determining if each sequentially received tuple is distinct includes instructions for maintaining a hash table, for verifying uniqueness of tuples using the hash table and for adding each unique sequentially received tuple to the hash table.

14. The computer readable medium of claim 12 in which the instructions for determining if each sequentially received tuple is distinct further includes instructions for maintaining a sorted data structure, for verifying uniqueness of tuples using the sorted data structure and for adding each unique sequentially received tuple to the sorted data structure.

15. A computer readable medium containing program instructions for the retrieval of distinct tuples in a relational database management system, the program instructions for providing a distinct operator component, providing a source component, and
providing an auxiliary logger component, wherein the relational database management system supports the provision of data from a defined table to a consumer process, wherein the consumer process requests data from the distinct operator component, wherein the instruction for the distinct operator component further includes instructions for:
sequentially requesting a set of tuples from the source component upon a request from the consumer process, sequentially passing one or more tuples in the set of tuples to the auxiliary logger component for uniqueness verification, and
passing only verified unique tuples to the consumer process, the source component comprising code means for accessing one or more tuples in the set of tuples from the defined table upon request from the distinct operator component and returning a subset of tuples to the distinct operator component, and wherein the instructions for the auxiliary logger component further including instructions for sequentially receiving a verification set of tuples in the set of tuples from the distinct component and for determining using an auxiliary component if each sequentially received tuple is distinct from other previously returned tuples in the sequence to verify the uniqueness of each sequentially received tuple to the distinct operator component and indicating whether the retrieved tuple has been previously received by the auxiliary component.

16. The computer readable medium of claim 15 wherein the instructions for determining if each sequentially received tuple is distinct includes instructions for maintaining a hash table and for verifying uniqueness of tuples using the hash table and for adding each unique sequentially received tuple to the hash table.

17. The computer readable medium of claim 15 in which the instructions for determining if each sequentially received tuple is distinct includes instructions for maintaining a sorted data structure and for verifying uniqueness of tuples using the sorted data structure and for adding each unique sequentially received tuple to the sorted datastructure.

* * * * *